Aug. 13, 1935.  E. L. TRANAAS  2,011,427
POWER CLUTCH
Filed Nov. 13, 1933
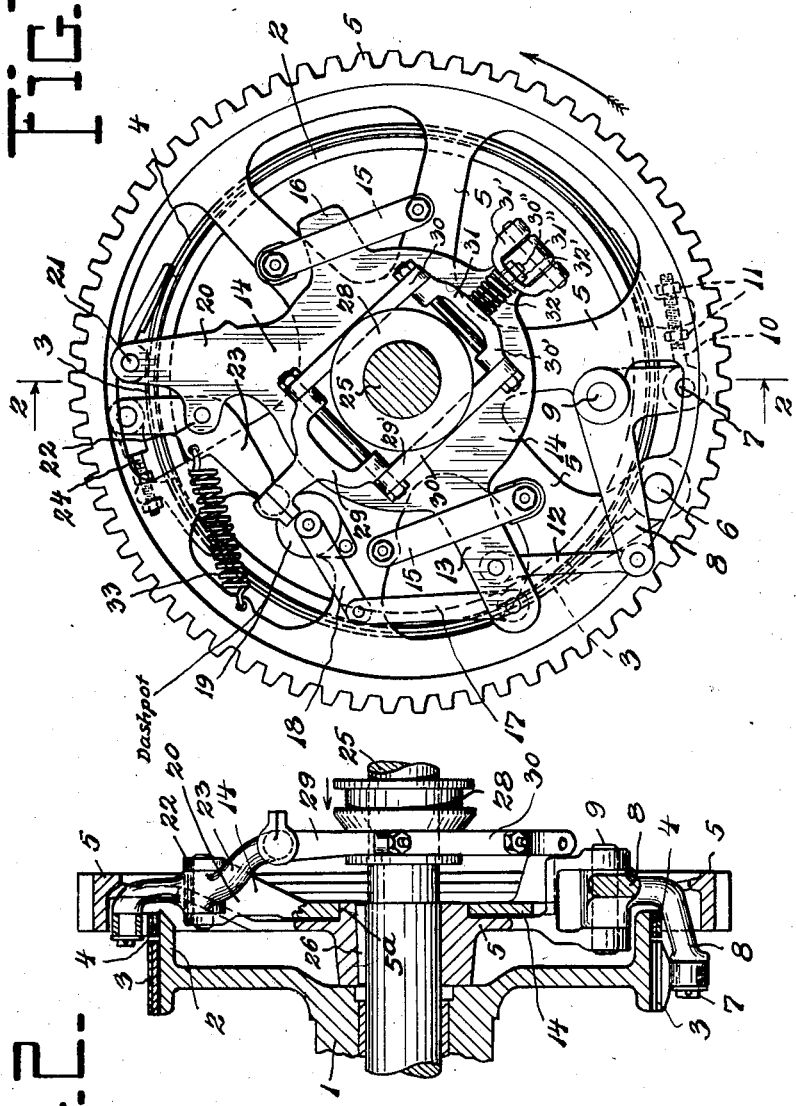
Inventor
EMIL L. TRANAAS.
By Robert Cobb
Attorneys Patented Aug. 13, 1935

2,011,427

UNITED STATES PATENT OFFICE 2,011,427

POWER CLUTCH

Emil L. Tranaas, Milwaukee, Wis., assignor to Koehring Company, Milwaukee, Wis., a corporation Application November 13, 1933, Serial No. 697,825

5 Claims. (Cl. 192—35)

This invention embodies a novel design of clutch mechanism useful in conjunction with cranes and like machines where cable or operating drums are required to be connected with suitable drive mechanism time and again in the operation of the machine.

The essential object of the invention is to lighten the work of the operator of the machine by relieving him of the exertion necessary to throw in the clutch, an operation which has to be performed in crane machinery many times in the connecting with and disconnecting of the drum operating device from the motive power carried by the machine.

In the carrying out of the present invention it is contemplated to employ what I term a primary clutch or clutch band associated with the main clutch or clutch band in such a way that by the operation of the primary clutch band the resistance load of the driven member which is to be clutched to the driving mechanism is availed of to impart movement to the carrier of the primary clutch band. This movement of the said carrier is utilized by the provision of suitable connections between said carrier and the main clutch band whereby the said movement is caused to apply the main clutch band to clutch the driven member to the driving member effectively for the performance of the work of driving said driven member.

In the specific embodiment of the invention as shown in connection herewith, wherein the clutch mechanism is employed in connection with crane machinery, the driven member will comprise a cable drum or the like, the latter designed to do any necessary work such as commonly a part of the operation of crane machines. The driving member utilized is a gear driven by the motor or other source of power of the general machine and the required functioning involves the clutching of this driving gear to the drum for effecting the rotation of the latter. For this purpose there is preferably availed of a clutch drum attached to the cable drum and there is preferably mounted upon the driving gear the primary clutch band carrier. This clutch band carrier is susceptible of relative movement by reason of its peculiar mounting upon the driving gear, in relation to the driving gear, and the primary clutch band is preferably a comparatively narrow band with limited clutching surface susceptible of very easy operation to apply it to the clutch drum of the driven member. Now the primary clutch band carrier is linkedly or otherwise connected to the main clutch band designed for transmitting the driving forces of the driving gear or member to the driven member which is a cable drum. Therefore, in the use of the above described mechanical devices, it is possible for the operator easily to effect a preliminary application of the primary clutch band supported on what is herein called its floating carrier. Such application sets up a reaction force transmitted by the primary clutch band from the cable drum or driven member to the primary clutch band carrier, this reaction force being derived from the resistance load placed upon the primary clutch band by its initial operation of connecting it to the clutch drum. Thus, since the clutch carrier connected with the primary clutch band is a floating part movable relatively to its supporting driving gear, the application of the primary clutching band applies a retarding force to the said floating carrier during the continuing driving movement of the driving gear or member, whatever it may be, upon which the said carrier is mounted or to which it is related in a movable manner. It is this force of retardation established by the resistance load of the driven member transmitted through the primary clutch band to the carrier of the latter, and causing the relative movement of the carrier as regards its associated driving member or gear, which causes actuation of the connections between the carrier and the main clutch band such that the latter will be effectively applied to the clutch drum surface of the driven member or cable drum, such last mentioned application involving no manual effort whatsoever on the part of the operator of the clutch means.

With the foregoing principle of operation of this invention in mind, it is notable that another special feature of the invention lies in the provision of shock absorbing means associated with the main clutch actuating device whereby to cushion the movement of said last mentioned device so that the main clutch band will not grab too suddenly with resultant disadvantages of an obvious nature.

In the accompanying drawing—

Figure 1 is a side view showing essentially all of the primary and main clutch parts as associated with the driving gear of an ordinary crane cable drum driving unit.

Figure 2 is a vertical sectional view taken on line 2—2, certain parts being shown in elevation. This figure brings out more clearly the relative mounting of the parts shown in Figure 1, and the clutch drum, which is carried by the cable drum loosely supported on the driving shaft for the driving gear.

Referring first to Figure 2 of the drawing, those versed in the art will readily recognize the familiar construction of an ordinary cable drum 1 of a shovel or similar type crane, this cable drum being usually equipped with opposing heads intermediate which is the hub that provides the cable winding surface of the drum. This drum 1 is termed the driven member of the clutch mechanism and it is to be understood that it need not be a cable drum at all, since as a driven member it may perform other functions entirely distinct from that of a cable winding device. The said driven member 1 is equipped with a clutch drum or member 2 about which are disposed the main clutch band 3 and what is termed the primary clutch band 4, the word "primary" being used in the sense that in the operation of the clutch mechanism said primary clutch or clutch band is initially operated in order to bring into operation and effective action the main clutch band or clutch part 3. The main clutch band 3, as will best be seen in Figure 1, is carried by or connected with the driving member 5 in the form of a driving gear suitably operated by gearing leading to a motor or other source of power. The dead end of the main clutch band is connected at 6 with the driving gear whilst the live end of said band is connected at 7 to a bell crank lever 8 pivoted at 9 to said gear 5. The connection 7 between the live end of the main clutch band 3 and the lever 8 involves a suitable adjusting bolt 10 with the adjusting nuts 11, which, however, do not form any particular feature of the present invention. The arm of the lever 8 opposite that connected with the live end of the main clutch band 3 is attached by a link 12 to an arm 13 of what is termed the floating primary clutch band carrier 14. This clutch band carrier 14 is freely and floatingly mounted as shown in Figure 2, upon the driving gear 5 by means of a central bearing portion of the carrier 14 which has a sort of swivel or freely rotative connection by encircling an extension 5a of the hub portion of the driving gear 5, see Figure 2. In order to hold the floating carrier 14 in place upon the driving gear 5 but in such a manner that it may have a certain amount of rotation on the gear 5, there are provided guide and retaining plates 15, one of which extends over the arm 13 previously mentioned and the other of which extends over an oppositely projecting arm 16, as seen in Figure 1, the said plates 15 being attached by suitable fastenings to spokes of the driving gear 5 in a self-evident manner.

From the foregoing it will be seen that if movement of the carrier 14 relatively to the gear 5 is caused in one direction, the link 12 may pull on the connected arm of the lever 8 and effect a tightening or application of the main clutch band 3 around the drum 2.

There will now be described more fully the manner in which the primary clutch band 4 is equalized to cause the carrier 14 to have the movement relative to the gear 5 which will cause the application of the main clutch band 3 to the drum 2. From the arm 13, which, as previously stated, is connected to the clutch band actuating lever 8, there leads a link 17 connecting said arm to the lever arm 18 of a shock absorber 19, which may be of any suitable type such as operates on the dash-pot principle and which is mounted on the gear 5, the purpose of which will appear more fully hereinafter. Connected to an offstanding arm 20 of the floating carrier 14 is the dead end of the primary clutch band 4, see Figure 1, the point of attachment being designated 21. The arm 20 has an extension 22 that supports the pintle axis of the clutch band actuating lever 23 for the clutch band 4. One end of the lever 23 is attached to the live end of the clutch band 4 by the adjustable take up bolt 24. The other end of the lever 23 is shiftable radially inwardly and outwardly with respect to the axis of the gear 5. It may be mentioned that said axis of the gear 5 is an ordinary driving shaft 25 to which the gear 5 is keyed as at 26, see Figure 2. For the purpose of actuating the lever 23, any conventional clutch operating means may be utilized, for instance a shifting yoke cooperating with the grooved sleeve member 28, which sleeve member is connected to a yoke 29' comprising the floating toggle lever 29 connected to the inner arm of the lever 23, said toggle lever 29 being connected pivotally with the side members 30, which are likewise connected to the toggle lever 31, which comprises a forked part 30' having a stem 30" and a clevis 31'. A spring 32 is attached between the forked part and clevis, which latter is pivotally secured to an extension 31" of the carrier 14. The stem 30" is movably arranged within the clevis 31' and is provided with a lock nut 32' to prevent its separation from the clevis 31'. The spring 32 is pressed slightly when the primary clutch band 4 is engaged. This spring is intended to compensate for a certain amount of wear of the primary clutch band lining and also it is designed to prevent the band from becoming too tight incident to the heating or expansion of the drum 2 with which it cooperates. As the clutch throw or actuating means for the lever 23 that actuates the live end of the clutch band 4 may be conventional, it is not desired to be limited to the specific means herein described and according to the accompanying showing. The spring 32 holds the primary clutch band out of contact with the drum when the clutch is in inoperative position and this assures the proper release of the main clutch band under the influence of spring 33.

There is established a connection between the driving gear 5 and the floating carrier 14 by means of the coiled spring 33 which is attached at one end to a portion of the body structure of the gear and at the other end is attached to the middle portion of the actuating lever 23 of the band 4. The purpose of the spring 33 is to maintain the carrier 14 normally in a position of its relative rotation regarding the gear 5, wherein the carrier does not exert any force upon the main clutch band 3 to apply the same.

With the foregoing description of the construction of the clutch mechanism hereof in view, the operation obtainable therefrom is as follows:—

Let it be assumed that the gear 5 is in rotation in the direction of the arrow in Figure 1 and that the sleeve member 28 is shifted in the direction of the arrow in Figure 2 so as to rock the lever 23 to tighten the primary clutch band 4 about the drum 2. In the above operation the gear 5 is rotating and the carrier 14 with its controlled clutch band 4 is rotating with the gear 5 because of the connecting coiled spring 33. Likewise, of course, the main clutch band 3 is rotating with the gear 5 because it is connected positively with said gear by being supported thereon.

The initial application of the narrow primary clutch band 4 to the drum 2, which we will say is at the time stationary, throws upon the clutch band 4 the resistance load of the inertia of the drum 1, and immediately that this load is placed upon the clutch band 4 it is transmitted to the carrier 14, which necessarily is retarded instantaneously in its movement previously incident to the movement with the gear 5, so that the carrier 14 is retarded by the force of the resistance load placed upon the band 4 whilst the gear 5 continues to rotate at its normal fixed rate of speed. By reason of the foregoing a relative movement of the carrier 14 in a clockwise direction, so to speak, as respects the gear 5, is compelled, the same being permitted by the expansion of the spring 33. Practically speaking, this clockwise relative movement of the carrier 14 with respect to gear 5 is established by momentary retardation of its movement upon the resistance load of the drum 2 being placed upon the band 4, whilst the gear 5 continues its regular movement in a counter-clockwise direction.

Now according to this invention, the relative movement of the carrier 14 and the gear 5 is translated into an actuating movement by the carrier 14 of its arm 13 and through the arm 13 the lever 8 connected with the live end of the main clutch band is actuated so that the main clutch band 3 is applied to the clutch drum 2 with proper clutching force to thus connect with efficient clutch action the gear 5 to the drum 1. Thereafter the drum 1 is compelled to rotate through the clutching force of both the main clutch band 3 and the primary clutch band 4, the action of the latter of which caused the application of the former clutch band 3 to the drum 2.

If and when the clutch band 4 is released from the drum 2 by actuation of the sleeve member 28 in the proper direction, the same causing rocking of the lever 23, releasing clutch band 4, the spring 33 will shift the carrier 14 rotatively relatively to the gear 5 in a counter-clockwise direction and this shifting movement will, through the parts 12, 8, and 10, cause release movement of the main clutch band 3 respecting the drum 2, and unclutching of the gear 5 from the driven member 1 will thus be effected.

It will be seen that the shock absorber 19 previously referred to is advantageously used to cushion the engagement of the main clutch band 3 and the drum 2 and thus eliminate jerks and shocks incident to the clutching operation.

The sole purpose of the primary or narrow band 4 is to furnish the power to act upon the live end of the main clutch band 3; or, after the clutch is fully engaged, to react the pull in the live end of the main clutch band 3.

The force delivered to the live end of the main clutch band 3 is very considerable compared to the force exerted upon the primary clutch band 4 by the operator, due to the wrapping action of the primary clutch band 4 around the large diameter of the drum 2. The primary clutch band 4 may, therefore, be set very loose on the drum 2; the spring 32 possessing the correct compressive effort to produce the force necessary at the live end of the main clutch band 3, thereby making the operation of the clutch exceptionally easy at all times.

Spring means 32, 33 are provided to keep both clutch bands from the clutch drums when released. Also only a minimum amount of slippage of the main band can take place, because spring 32 being strong enough to keep the primary clutch band 4 from slipping, any slippage on the part of the main band 3 will cause a further relative movement between the gear 5 and the carrier 14, thereby immediately setting the main clutch band 3 tight enough to carry the load without further slipping. For the above reasons, the clutch will remain unusually cool even during continuous operation.

Having thus described my invention, what I claim as new and desire to secure by Letters Patent of the United States, is—

1. In clutch mechanism of the class described, in combination, an operating drum equipped with a clutch drum surface and constituting a driven member, a driving member, a primary clutch member comprising a contractible friction band movably mounted on the driving member for cooperation with the said clutch drum surface, a main clutch member comprising a second contractible friction band carried by the driving member and disposed for cooperation with the clutch drum surface so as to connect the driving member positively to the driven member, instrumentalities for causing application of the primary clutch member to the clutch drum surface of the driven member independently of the main clutch member so that relative rotary movement of the primary clutch member and the driving member will be caused by the resistance load of the inertia of the driven member when the primary clutch member is applied to said clutch drum surface, and connections between the primary clutch member and the main clutch member for causing operative clutching engagement of the main clutch member respecting the driven member incident to said relative rotary movement of the primary clutch member and driving member.

2. In clutch mechanism of the class described, in combination, a driving member, a driven member, a primary clutch part, a carrier connected with said clutch part and movable in relation to the driving member, a main clutch part for cooperation with the driven member, connecting means between the main clutch part and said carrier such that relative movement of the carrier and the driving member will cause application of the main clutch part to connect the driving and driven members, means for initially actuating the primary clutch part, while said main clutch part is maintained normally disengaged, to connect the same with the driven member to transmit the resistance load of said driven member clutching operation to the carrier for causing actuation of the carrier in the manner stated for effecting application of the main clutch part to connect the driving and driven members, and a shock absorbing member connected to the carrier for cushioning the movement of the latter by which the main clutch part is caused to connect the driving and driven members.

3. In clutch mechanism of the class described, in combination, a driving member, a driven drum operating member, a carrier floatingly mounted upon said driving member, a clutch drum surface carried by the driven drum operating member, a main clutch cooperative with said surface for connecting the driving member to the driven drum operating member, a primary clutch connected to said floating carrier and cooperative with said clutch drum surface, instrumentalities for applying the primary clutch member to the clutch drum surface aforesaid, whereby the resistance load of the inertia of the driven drum operating member may be transmitted to the carrier of the driving member to move the carrier relatively to the driving member, linkage connecting the carrier aforesaid with the main clutch member so that when the carrier moves relatively to the driving member in one direction, the main clutch will be effectively applied to the clutch drum surface, spring means connecting the driving member and the floating carrier for normally holding the carrier so related to the driving member that the main clutch is inactive in relation to the clutch drum surface and for restoring the carrier to its normal position after the carrier has moved relatively to the driving member and caused actuation of the main clutch member aforesaid, and shock absorbing means connected to the carrier for cushioning the application of the main clutch member when actuated from the carrier incident to the relative movement of the latter respecting the driving member.

4. In clutch mechanism of the class described, in combination, a driving member, a driven member having a clutch-engaging surface, clutch devices intermediate said driving and driven members including a primary clutch device mounted on said driving member and having the form of a clutch band extending about and disposed for operative engagement with the clutch-engaging surface of said driven member, a carrier on said driving member normally coacting therewith and having a yielding connection therewith permitting relative motion therebetween, one end of said primary clutch band being fixedly connected to said carrier and the other end of said primary clutch band being movably connected to said carrier for movement towards and away from the fixed end, instrumentalities for moving said movable end of said band towards the fixed end to effect clutching engagement of said band with respect to the clutch-engaging surface of said driven member, such engagement effecting a preliminary connection between said driving and driven members and imparting relative yielding motion to said carrier with respect to said driving member, a main clutch device mounted on said driving member and having the form of a clutch band also disposed for operative engagement with the clutch-engaging surface of the driven member, one end of said main clutch band being fixedly connected to said driving member and the other end of said main clutch band being movably connected to said driving member for movement towards and away from said fixed end, and instrumentalities intermediate said movable end of said main clutch band and said carrier for actuating said movable end towards said fixed end incident to relative movement of said carrier with respect to said driving member as aforesaid, said last mentioned movement positively connecting said driving and driven members.

5. In clutch mechanism of the class described, in combination, a driving member, a driven member, clutch devices intermediate said driving and driven members comprising a main clutch part for transmitting movement of the driving member to the driven member, an associated clutch part adapted to be connected with the driven member so as to be actuated by the resistance load of the inertia of the driven member, connections between said associated clutch part and the main clutch part such that the actuation of the associated clutch part will be transmitted to the main clutch part for causing clutch engagement actuation of the main clutch part resulting in clutching engagement between the driving and driven members, and a shock absorber coacting with the main clutch part for cushioning its clutch engagement actuation initiated by the operation of the associated clutch part, said shock absorber being inactive at all times except during the engagement actuating period of the main clutch part.

EMIL L. TRANAAS.